(12) United States Patent
Eichelberger

(10) Patent No.: US 7,695,179 B2
(45) Date of Patent: Apr. 13, 2010

(54) ILLUMINATING DEVICE

(75) Inventor: Christopher L. Eichelberger, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 262 days.

(21) Appl. No.: 11/687,493

(22) Filed: Mar. 16, 2007

(65) Prior Publication Data

US 2008/0225548 A1 Sep. 18, 2008

(51) Int. Cl.
 *F21V 7/04* (2006.01)
(52) U.S. Cl. .......................... 362/620; 362/26; 362/551; 362/600; 362/601; 362/619
(58) Field of Classification Search .................. 362/26, 362/487, 551, 600, 601, 619, 620
 See application file for complete search history.

(56) References Cited

U.S. PATENT DOCUMENTS

| | | | |
|---|---|---|---|
| 4,496,211 A | 1/1985 | Daniel | |
| 5,659,643 A | 8/1997 | Appeldorn et al. | |
| 6,575,584 B1 | 6/2003 | Habraken | |
| 6,659,615 B2 | 12/2003 | Umemoto | |
| 6,724,543 B1 | 4/2004 | Chinniah et al. | |
| 7,018,087 B2 | 3/2006 | Yoo | |
| 7,025,482 B2 * | 4/2006 | Yamashita et al. | 362/511 |
| 7,104,678 B2 | 9/2006 | DeLamberterie | |
| 7,114,820 B1 | 10/2006 | Parikka et al. | |
| 7,494,257 B2 | 2/2009 | Gebauer et al. | |
| 2001/0038539 A1 | 11/2001 | Lea et al. | |
| 2004/0202003 A1 | 10/2004 | Lyst, Jr. | |
| 2005/0049368 A1 | 3/2005 | Maruyama et al. | |
| 2005/0276565 A1 | 12/2005 | Bourdin et al. | |
| 2006/0050282 A1 | 3/2006 | de Lamberterie | |

FOREIGN PATENT DOCUMENTS

| | | |
|---|---|---|
| DE | 103 28 216 | 1/2005 |
| DE | 10 2005 059 958 | 6/2007 |

(Continued)

OTHER PUBLICATIONS

Emil P. Stefanov; Improved Light Guide Design for Automotive Signal Lamps; ISAL 2005 Symposium; Darmstadt University of Technology.

(Continued)

*Primary Examiner*—Sandra L O'Shea
*Assistant Examiner*—Meghan K Dunwiddie
(74) *Attorney, Agent, or Firm*—Brinks Hofer Gilson & Lione

(57) ABSTRACT

An illuminating device has a light pipe that is elongate in shape and has a light-emitting face running in the direction of a longitudinal axis. A light-reflecting face is disposed opposite the light-emitting face, and the light-reflecting face has a plurality of prismatic cuts. Each prismatic cut includes a front face oriented at an angle B from a normal axis, the normal axis being 90 degrees from the longitudinal axis of the light pipe. The angle B is in the range of about 5 degrees to about 45 degrees and is such that it allows light to refract through at least one prismatic cut and then be internally reflected.

15 Claims, 7 Drawing Sheets

FOREIGN PATENT DOCUMENTS

| | | | |
|---|---|---|---|
| EP | 0900694 | B1 | 3/1999 |
| EP | 1055867 | B1 | 11/2000 |
| EP | 1154197 | A3 | 11/2001 |
| EP | 1170545 | B1 | 1/2002 |
| EP | 1176360 | B1 | 1/2002 |

OTHER PUBLICATIONS

Communication from German Patent Office dated Feb. 13, 2009.

* cited by examiner

ILLUMINATING DEVICE

BACKGROUND

1. Field of the Invention

The present invention generally relates to illuminating devices and, more specifically, to light pipes and light guides. The assembly according to the present invention will find utility in vehicle lighting systems, as well as in a variety of non-automotive illumination applications.

2. Description of Related Art

Light pipes and light guides are used in exterior vehicle lighting applications and a variety of other applications, such as interior vehicle lighting applications, interior and exterior architectural lighting, and backlighting for liquid crystal display screens. A typical light pipe has an elongate shape and light-emitting diodes (LEDs) at both ends of the light pipe. Generally, a plurality of prisms or prismatic cuts are formed within the light pipe, which are intended to reflect light out of a side of the light pipe. The prismatic cuts are disposed on one face of the light pipe and a light-emitting face is disposed opposite the prismatic cuts. Light rays entering an end (or both ends) of the light pipe are incident at the surface of the prismatic cuts, and are reflected back through the cross-section of the light pipe so as to exit the light pipe through the light-emitting face, which is disposed opposite the face having the prismatic cuts, as noted above.

Light pipes can be oriented vertically or horizontally. The prismatic cuts are typically designed with large angles of inclusion, so that when a light beam traveling within the light pipe hits a particular prism or prismatic cut, the light beam is totally internally reflected and exits the light pipe through the surface opposite the prismatic cut. However, when a light pipe is tilted away from an axis perpendicular to the line of sight, light is reflected out of the light pipe at an oblique angle to the line of sight. In such a situation, the light pipe appears to emit less light and appears dimmer than if the light pipe was oriented perpendicular to the line of sight.

In the context of vehicle exterior lighting, exterior lights must emit enough light to meet governmental photometric requirements. Additionally, styling desires require light pipes to be oriented around curves to have rake and plan angles that are not perpendicular to the line of sight. As the styling requirements are achieved, the governmental photometric requirements become difficult to achieve, and vice versa. Some of the problems of light control have been addressed by placing light sources at both ends of the light pipe, because a single light source at one end of a light pipe has not typically been capable of providing light to a distal end of a light pipe having curves, rake, and plan angles that are not perpendicular to the line of sight. However, using only one light source would be more advantageous in the context of packaging requirements, thermal performance, and cost.

In view of the above, it is apparent that there exists a need for a light pipe that can be tilted at an angle from the line of sight and/or oriented around curves and still continue to meet governmental and vehicle manufacturer photometric requirements for light emission.

SUMMARY

The present invention provides a light pipe having an elongate shape. The light pipe has a light-emitting face running in the direction of a longitudinal axis and a light-reflecting face disposed opposite the light-emitting face. The light-reflecting face includes a plurality of prismatic cuts formed over at least a portion of the length of the light pipe. The prismatic cuts are designed to refract light rays through at least one prismatic cut before the light rays are totally internally reflected.

Each prismatic cut has a front face oriented at an angle B from a normal axis, wherein the normal axis is oriented 90 degrees from the longitudinal axis of the light pipe and extends through the light-emitting face and the light-reflecting face. The angle B is in the range of about 5 degrees to about 45 degrees.

In another aspect, an illuminating device for use in a motor vehicle is provided. The illuminating device has an elongate light guide with a light-emitting face running in the direction of a longitudinal axis and with a light-reflecting face disposed opposite the light-emitting face. The light-reflecting face includes a plurality of prismatic cuts formed over at least a portion of the light guide. Each prismatic cut has a front face oriented at an angle B from a normal axis, wherein the normal axis is oriented 90 degrees from the longitudinal axis of the light guide and extends through the light-emitting face and the light-reflecting face. The angle B is in the range of about 5 degrees to about 45 degrees. The illuminating device has a light source coupled to an end of the light guide, either directly or indirectly.

Further objects, features and advantages of this invention will become readily apparent to persons skilled in the art after a review of the following description, with reference to the drawings and claims that are appended to and form a part of this specification.

DETAILED DESCRIPTION

Figure 1:
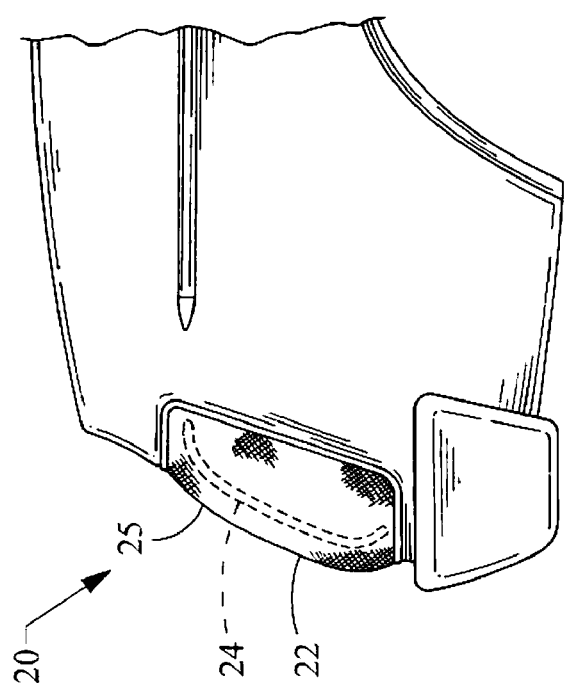
FIG. 1 is a side view of the rear end of a motor vehicle, having an illuminating device embodying the principles of the present invention.

Referring now to the drawings, an illuminating device for use in a motor vehicle is provided. With reference to FIG. 1, the rear end 20 of a motor vehicle is shown generally. The rear end 20 includes a taillight assembly 22, of which a light pipe 24 is located inside of a cover 25 of the taillight assembly 22. Alternatively, the light pipe 24 could be installed in a signal light, parking lights, headlights, trim lighting, accent lighting, interior lights, instrument panel lights, or used in another industrial application. In other industries, light pipes are used in exterior and interior architectural lighting and liquid crystal display screens, among other uses.

Figure 2:
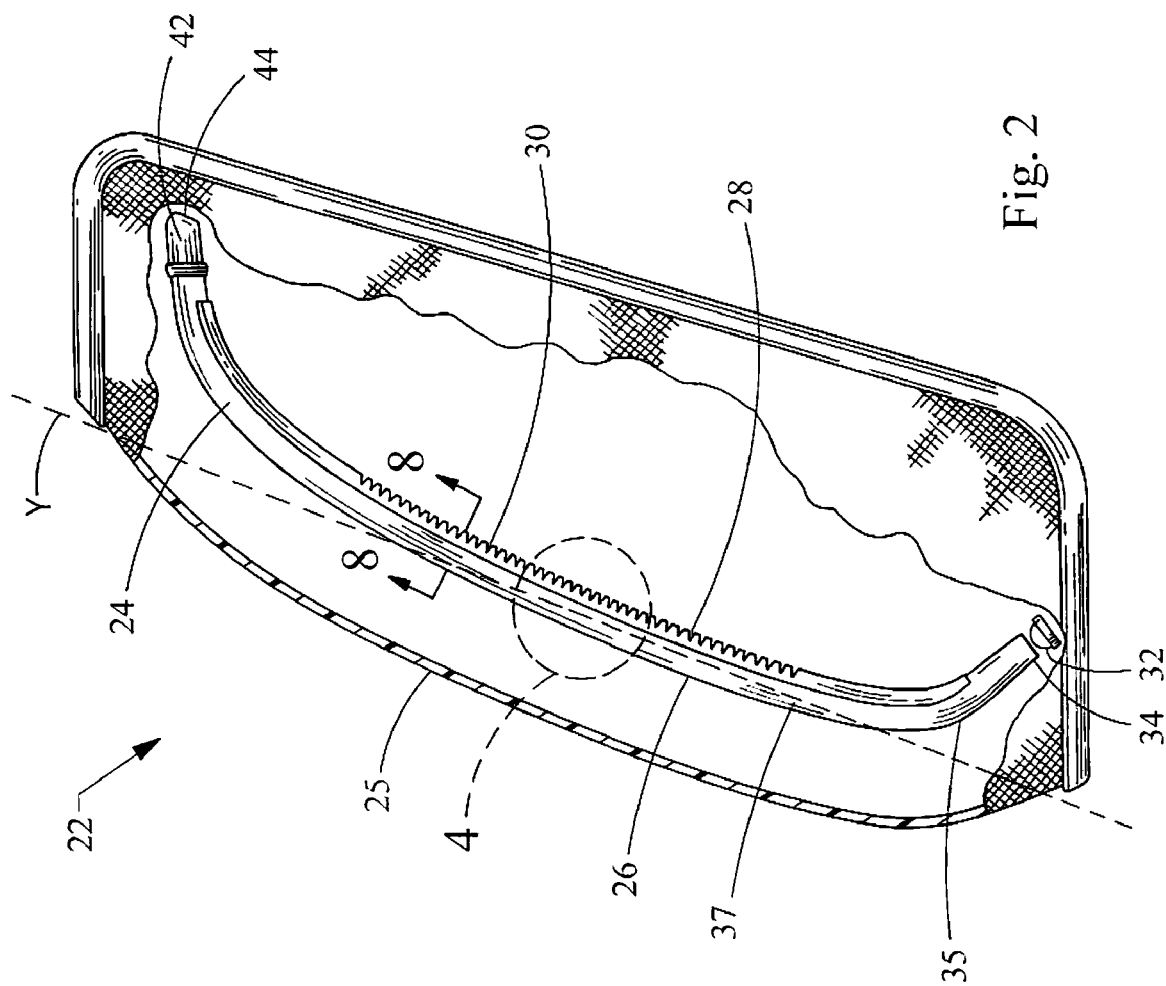
FIG. 2 is a partial sectional view of the illuminating device of FIG. 1.

Referring to FIG. 2, a cut-away view of the taillight assembly 22 shows the light pipe 24 in greater detail. The light pipe 24 has a light-emitting face 26, which is disposed opposite a light-reflecting face 28. Formed over at least a portion of the light-reflecting face 28 is a plurality of prismatic cuts 30. The faces or surfaces of the light pipe 24 preferably have a high "optical" quality. In automotive applications, a "Class A" finish is preferably used for these surfaces of the light pipe 24. These types of light pipes are usually made by injection molding or extrusion, which is known in the industry.

A light source 32 coupled into the light pipe 24 illuminates the light pipe 24. The in-coupling may be accomplished in a variety of ways. For example, the light source 32 could be placed in close proximity to a light-launching face 34 of the light pipe 24, with no other in-coupling optics. Alternatively, the light-launching face 34 of the light pipe 24 could have a partial spherical face, with the light source 32 located at the center of the curvature of the sphere. In another variation. an optical fiber could be used to bring light from a remote light source to the light pipe 24. In yet another variation, a reflector or optic could be used to collimate or focus light into the light pipe 24. Furthermore, the light in-coupling section of the light pipe 24 could be longer or shorter than shown in FIG. 2.

The light-launching face 34 may be disposed around a bend 35 from the main portion 37 of the light pipe 24, as shown in FIG. 2, or the light-launching face 34 could be located along the longitudinal axis Y of the light pipe 24. The light source 32 may be a light-emitting diode (LED), or any other suitable light source, such as a small incandescent light bulb.

Figure 3A:
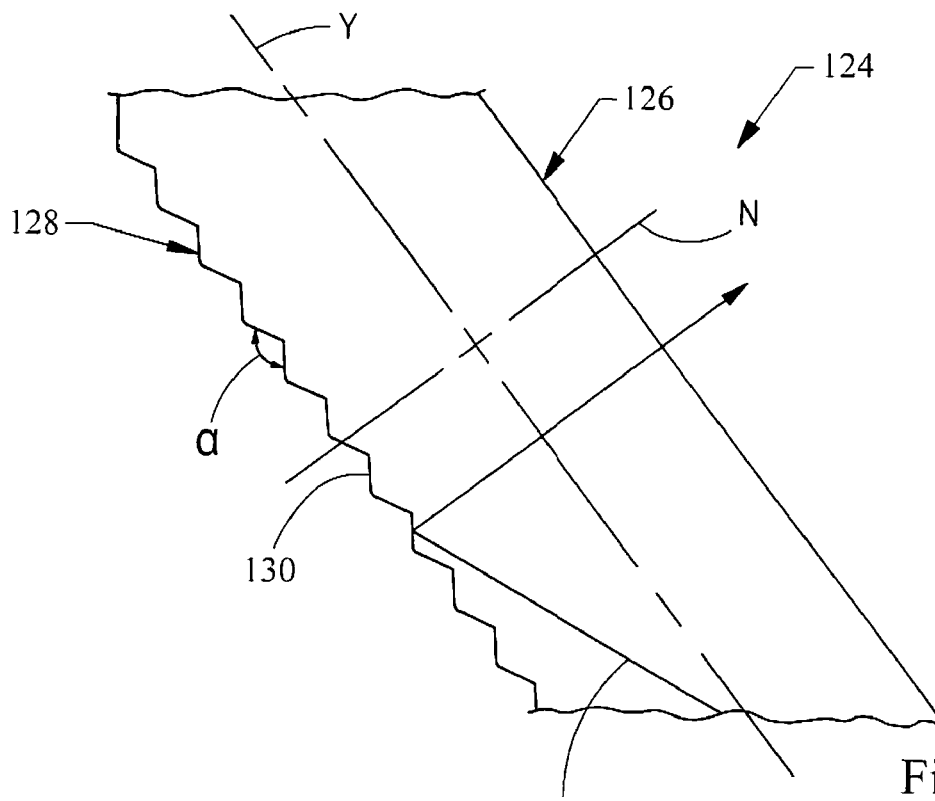
FIG. 3A is a side view of a section of a conventional light pipe.
Figure 3B:
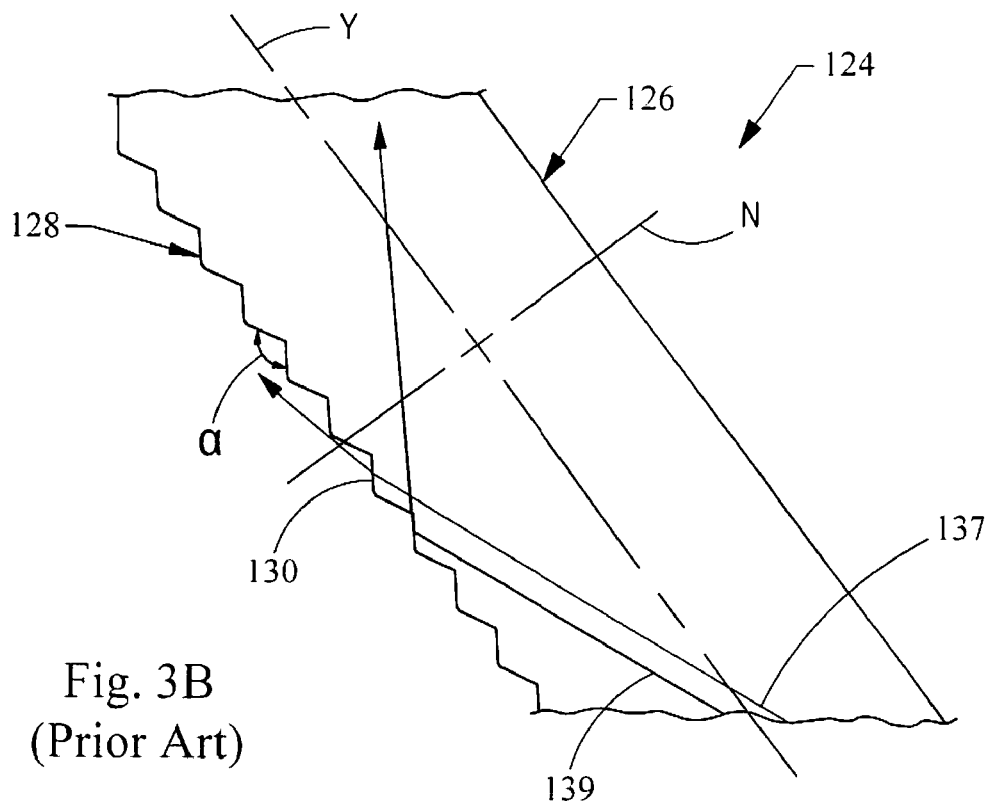
FIG. 3B is another side view of the conventional light pipe of FIG. 3A.

Referring now to FIGS. 3A-3B, a portion of a known light pipe 124 is shown. As seen therein, a plurality of prismatic cuts 130 are formed on a light-reflecting face 128. Each prismatic cut 130 of the known light pipe 124 has a large included angle, which is designated as α. The prismatic cuts 130 of this light pipe 124 are designed so that when a light ray 136 is incident at the surface of a prismatic cut 130, the light ray 136 is totally internally reflected back through the cross-section of the light pipe 124 and emitted from the light pipe 124 through the light-emitting face 126.

However, with reference to FIG. 3B, if the light pipe 124 is tilted away from the axis of the light source, light rays 137, 139 are incident on the surface of the prismatic cut 130 at angles less than the critical angle, where the critical angle is measured from the normal axis N, and the normal axis N is perpendicular to the longitudinal axis Y of the light pipe 124. Therefore, the light rays 137, 139 are not totally internally reflected toward the light-emitting face 126. Instead, the light rays 137 may be refracted out of the opposite side of the light pipe 124, or the light rays 139 may be reflected down the length of the light pipe 124. When light rays 137, 139 are sent in directions other than toward the light-emitting face 126, light intensity is decreased and governmental photometric requirements may not be met.

Figure 4:
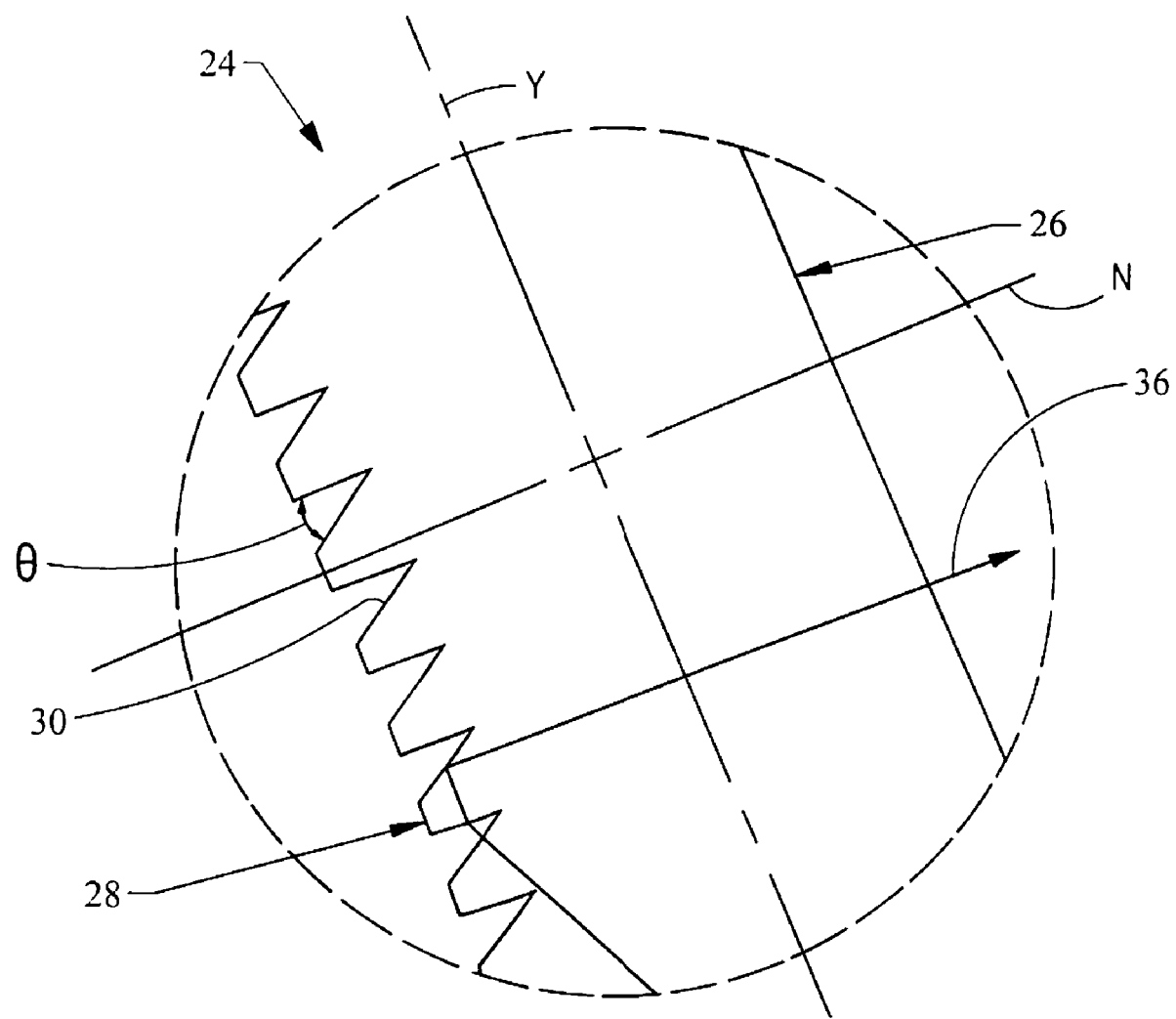
FIG. 4 is a side view of a section of a first embodiment of a light guide or light pipe embodying the principles of the present invention.

Referring now to FIG. 4, a portion of the light pipe 24 according to the present invention is shown therein. As noted previously, prismatic cuts 30 are formed in the light-reflecting face 28. Each prismatic cut 30 is provided with a relatively small angle of inclusion, designated as B. The prismatic cuts 30 in the present light pipe 24 are designed so that a light ray 36 may refract through at least one prismatic cut 30 before the light ray 36 is totally internally reflected toward the light-emitting face 26 and out of the light pipe 24. In other words, the prismatic cuts 30 are designed so that the light ray 36 will be incident on the surface of the prismatic cut 30 at an angle that is less than the critical angle, the critical angle being measured from the normal axis N, causing the light ray 36 to refract through the prismatic cut 30 instead of reflecting toward the light-emitting face 26. After refracting through at least one prismatic cut 30, the light ray 36 is incident on another prismatic cut 30 at angle an angle greater than or equal to the critical angle and is then totally internally reflected toward the light-emitting face 26 and out of the light pipe 24. It is ideal for the corners of the prismatic cuts 30 to be as sharp as possible with a maximum radius of 0.125 mm.

Figure 5:
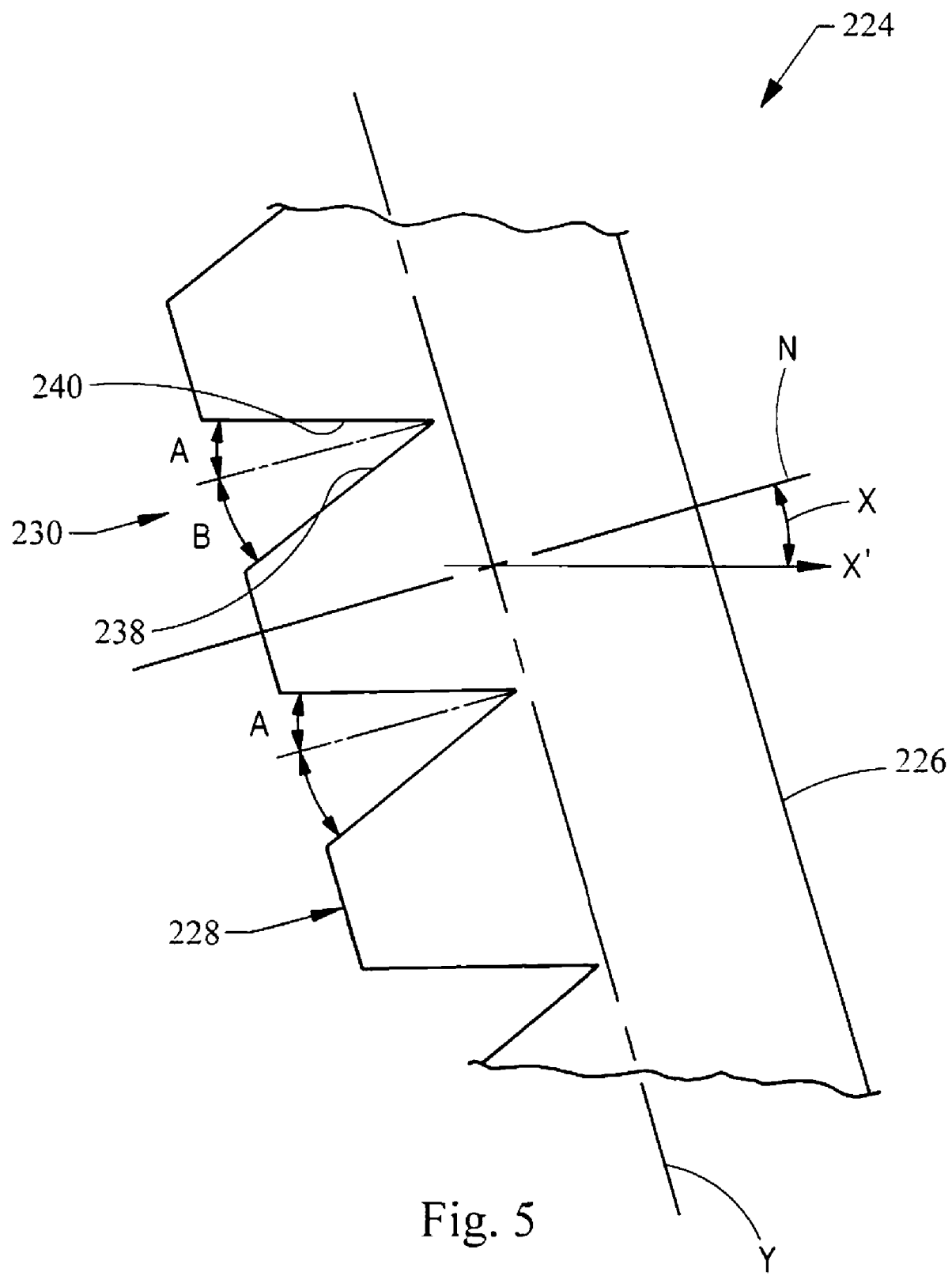
FIG. 5 is a side view of a section of a second embodiment of a light guide or light pipe.

Referring now to FIG. 5, a portion of an alternative construction of a light pipe 224 embodying the principles of the present invention is shown therein. As with the previous construction, the light pipe 224 is provided with a light-emitting face 226 and a light-reflecting face 228. Formed in the light-reflecting face 228 is a plurality of prismatic cuts 230. Each prismatic cut 230 has a front face 238, which is oriented at an angle B from a normal axis N (the normal axis N extending through the light-emitting face 226 and the light-reflecting face 228 and being oriented 90 degrees from the longitudinal axis Y of the light pipe 224). The angle B is accordingly measured from the normal axis N, or an axis parallel to the normal axis, to the front face 238. Preferably, this angle B is in the range of about 5 degrees to about 45 degrees. Each prismatic cut 230 also has a rear face 240 oriented at an angle A from the normal axis N or an axis parallel to a normal axis N. Angle A is preferably in the range of about zero degrees to about 40 degrees.

As the angle A approaches zero, as shown in the variation of FIG. 4, a light ray will likely refract through multiple prismatic cuts 230 before total internal reflection occurs. Conversely, as the angle A approaches 40 degrees, as shown in FIG. 5, the light rays will tend to refract through only one prismatic cut 230 before total internal reflection occurs.

The optimal dimensions of angles A and B depend on the desired angle X at which light should exit the light pipe 224 through the light-emitting face 226, for example, along the X' axis of FIG. 5. The greater the angle X is, the more difficult it has been in the past to emit enough light to meet photometric standards in exterior lights of motor vehicles.

The optimal angle B can be determined by calculating an intermediate angle based on the critical angle for total internal reflection and reducing the intermediate angle experimentally. Specifically, an intermediate angle B' can be calculated based on: 1) the critical angle of the material that the light pipe is made of, based on the material's index of refraction, and 2) the desired angle X of light emission from the light-emitting face 226. The angle B is less than or equal to B', as will be described further below. Angle B' is defined by Equation 1:

$$B' = \frac{\pi}{2} - \arcsin\left(\frac{1}{n}\right) - \arcsin\left(\frac{\sin(X)}{n}\right) \quad \text{Equation 1}$$

wherein X is the desired angle relative to the normal axis N for a light ray to exit the light-emitting face 226 and wherein n is the index of refraction pertaining to the particular material from which the light pipe or light guide is formed. Preferred materials for the light pipe 224 include polycarbonate and polymethyl methacrylate (PMMA), the latter of which is commonly known as acrylic. Other optical-grade plastics or glass are also suitable.

After B' is calculated, based on the index of refraction n and the desired angle of light emission X, the light pipe 224 may be modeled using optical simulation software. In the modeling program, B is initially set to B'. However, B' is not the optimal dimension of B, due to the fact that light rays are hitting the prismatic cuts 230 at a range of angles. In order to determine the optimal dimension of the angle B, the dimension of B is reduced from B' and the photometric performance is measured using optical simulation software. Several data points of an optimal angle B based on an angle X are plotted. These data points are then fit to a linear curve, and coefficients of the linear curve may be calculated for a particular material.

In a variation of a light pipe made of acrylic (PMMA), wherein the index of refraction n is approximately 1.493, angle B may be calculated, based on the desired angle of emission X using Equation 2:

$$B = -0.631(X) + 45.555 \qquad \text{Equation 2}$$

This linear equation has been determined using the method described above.

In a variation of a light pipe made of polycarbonate, wherein the index of refraction n is approximately 1.586, angle B may be calculated, based on the desired angle of emission X using Equation 3:

$$B = -0.581(X) + 47.068 \qquad \text{Equation 3}$$

This linear equation has been determined using the method described above.

Similarly the angle A is determined using optical simulation software, and is preferably set to an angle in the range of about 5 to about 15 degrees, although it is contemplated that the angle A could be anywhere from about zero to about 40 degrees. Thereafter, the dimension of A is altered and the photometric performance is measured using optical simulation software. Based on the desired angle of emission X, several data points of angle A are plotted, fit to a linear curve, and coefficients of the linear curve may be calculated for a particular material.

In a variation of a light pipe made of acrylic (PMMA), wherein the index of refraction n is approximately 1.493, angle A may be calculated, based on the desired angle of emission X using Equation 4:

$$A = +0.631(X) + 35 \qquad \text{Equation 4}$$

This linear equation has been determined using the method described above.

In a variation of a light pipe made of polycarbonate, wherein the index of refraction n is approximately 1.586, angle A may be calculated, based on the desired angle of emission X using Equation 5:

$$A = +0.581(X) + 24.922 \qquad \text{Equation 5}$$

This linear equation has been determined using the method described above.

Other angles can be used for the angles A and B without using the formulas in the preceding paragraphs and without using optical simulation software. For example, varying degrees of photometric performance may be ideal for light pipes used in a variety of applications. In the examples using polycarbonate and acrylic and with the goal of optimizing photometric performance, an angle X is less than or equal to about 45 degrees. Usually, X is greater than about 20 degrees because conventional light pipes known in the prior art, as shown in FIG. 3, are used for ranges of X of about zero to about 20 degrees.

A light source 32 could be provided at both ends of the light pipe 24. However, in vehicle exterior lighting applications, it may be advantageous for packaging, thermal performance, and cost reasons to place a light source 32 at only one end of the light pipe 24. The novel construction of the prismatic cuts 30 of the present invention is designed to meet photometric requirements without the need for a light source 32 at both ends of the light pipe 24. Alternatively, or in addition to the prismatic cuts 30 of the light pipe 24, a retroreflector 42 may be integrated with an end face 44 of the light pipe 24.

The retroreflector 42 is a retroreflective optic that directs light rays back down the light pipe 24. The light rays that strike the retroreflector 42 are light rays that have propagated through the light pipe 24 without being extracted. The retroreflector 42 sends the light rays back down the light pipe 24, and the light rays may then strike the light-reflecting face 28, be reflected toward the light-emitting face 26, and be emitted out of the light pipe 24 through the light-emitting face 26 as desired.

Figure 6:
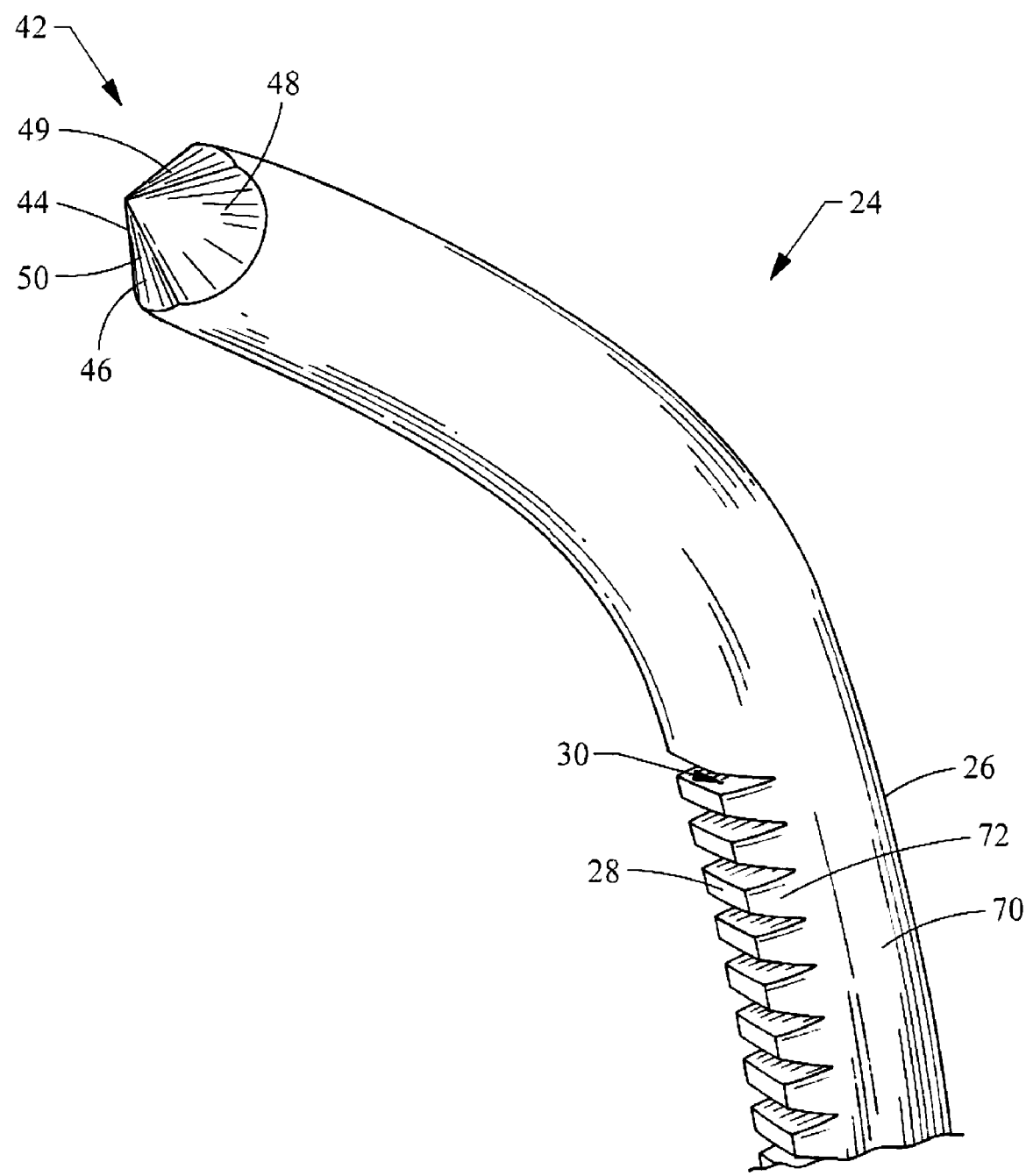
FIG. 6 is a perspective view of a section of the light guide of FIG. 2, having a first embodiment of a retroreflector at an end of the light guide.
Figure 7:
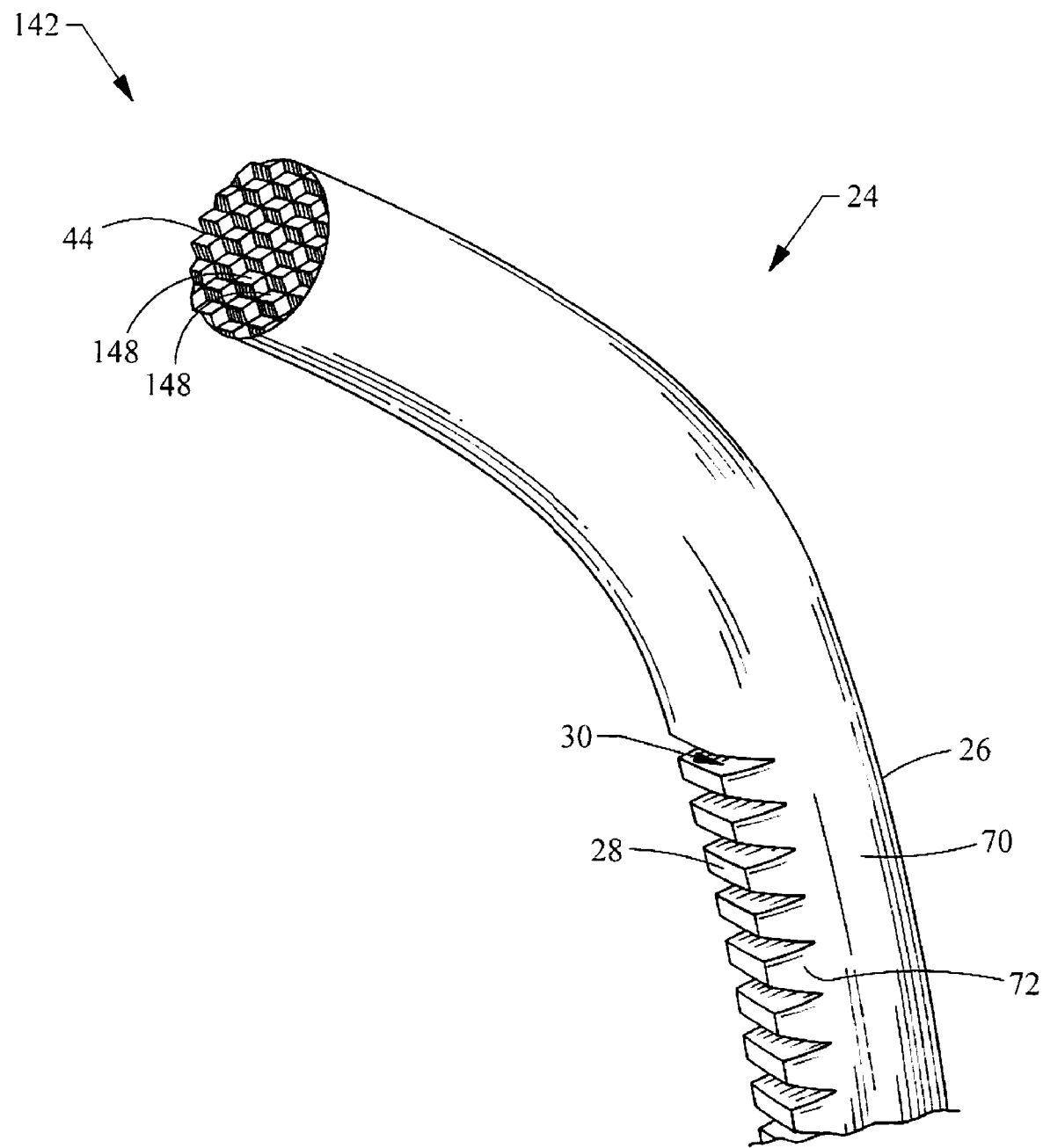
FIG. 7 is a perspective view of a section of the light guide of FIG. 2, having a second embodiment of a retroreflector at an end of the light guide.

Referring now to FIG. 6 and FIG. 7, two variations of a retroreflector 42 are shown. In the embodiment of FIG. 6, a large prism 46 is located at the end face 44 of the light pipe 24. The large prism 46 has the shape of a cube corner, which causes light rays that strike the retroreflector 42 to be reflected, by total internal reflection principles, back down into the light pipe 24 in a direction substantially the same as the incident direction the light rays. More particularly, the light rays are reflected three successive times by the three sides of the cube corner 48, 49, 50, and returned in a direction substantially parallel to the direction that the light rays first struck the retroreflector 42.

In the embodiment of FIG. 7, a retroreflector 142 is shown, which has a plurality of small prisms 148 located at the end face 44 of the light pipe 24. The small prisms 148 also have the shape of cube corners and reflect light rays in substantially the same way as the retroreflector 42 of FIG. 6.

Figure 8:
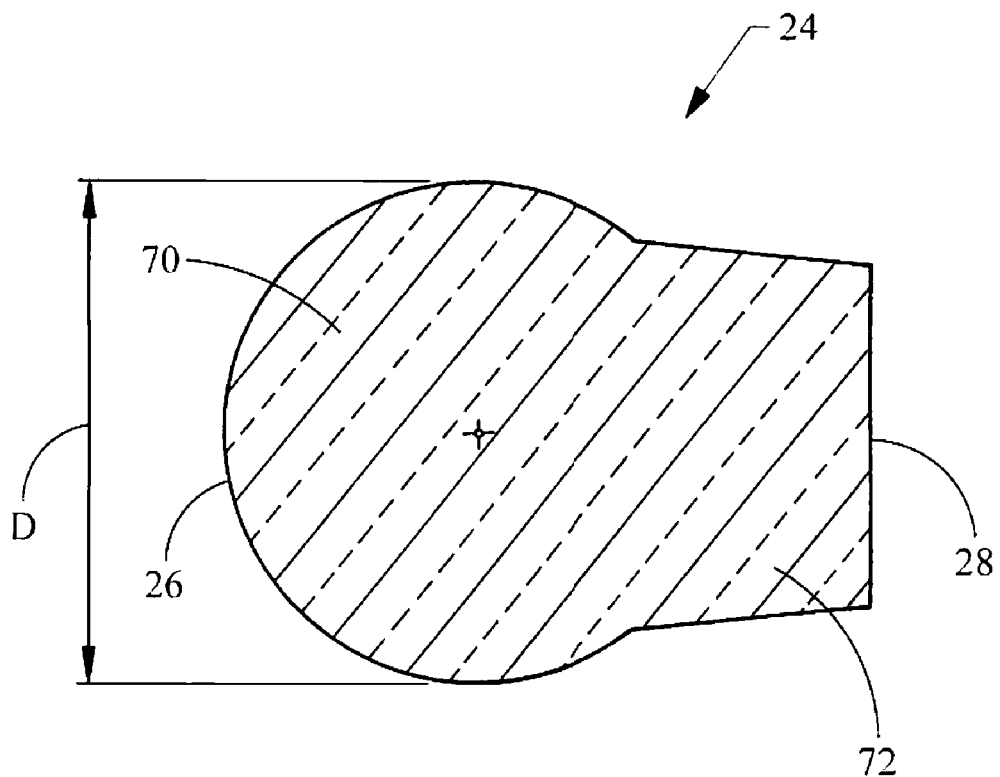
FIG. 8 is a first embodiment of a cross-section of the light guide of FIG. 2.

Referring now to FIG. 8, a light pipe 24 designed for use in a vertical orientation preferably has a cross-section comprising a circular portion 70 combined with a trapezoidal portion 72. The light-emitting face 26 is located on the circular portion 70 of the cross-section and the light-reflecting face 28 and prismatic cuts 30 are located on the trapezoidal portion 72 of the cross-section of the light pipe 24.

Figure 9:
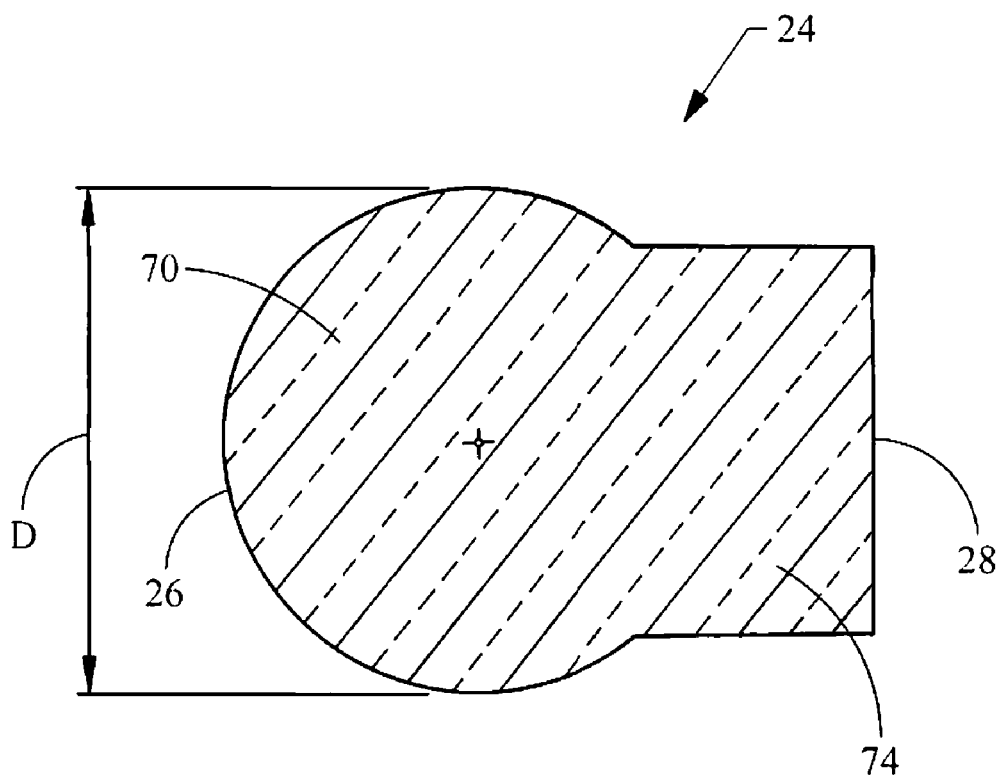
FIG. 9 is a second embodiment of a cross-section of the light guide of FIG. 2.

Referring to FIG. 9, a second embodiment of the cross-section of a light pipe 24 is shown. The light pipe 24 has a cross-section comprising a circular portion 70 combined with a rectangular portion 74, with the light-emitting face 26 being located on the circular portion 70 of the cross-section and the light-reflecting face 28 and prismatic cuts 30 being located on the rectangular portion 74. It is contemplated that the cross-section could be any other suitable configuration, especially for other applications, without falling beyond the spirit and scope of the present invention. For example, if the light pipe 24 was designed to be oriented horizontally, the cross-section would preferably comprise an elliptical portion combined with a trapezoidal or rectangular portion, or a rectangular portion having rounded corners combined with a second rectangular portion or trapezoidal portion. The diameter of the light pipe 24 for an automotive taillight application is preferably in the range of about 6 to 10 mm, as indicated by the dimension D in FIGS. 8-9; however, this dimension could vary, especially for other applications.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

I claim:

1. A light pipe comprising:
   a body having an elongate shape defining a length;

a light-emitting face extending along the body in the direction of a longitudinal axis along the length of the light pipe;

a light-reflecting face disposed opposite the light-emitting face over at least a portion of the length of the light pipe, a plurality of prismatic cuts being formed in the light-reflecting face;

each of the prismatic cuts having a front face oriented at an angle B from a normal axis, the normal axis being oriented 90 degrees from the longitudinal axis, wherein the angle B is in the range of about 5 degrees to about 45 degrees.

2. The light pipe of claim 1, wherein each of the prismatic cuts has a rear face oriented at an angle A from the normal axis, wherein the angle A is less than about 40 degrees.

3. The light pipe of claim 2, further comprising:

a light launching face located at a first end of the body; and a retroreflector located remote from the light launching face at a second end of the body, the retroreflector configured to reflect light back toward the first end of the body.

4. The light pipe of claim 2 having a cross-section comprising a member selected from the group consisting of: a circular portion, an elliptical portion, and a rectangular portion having rounded corners, combined with a member selected from the group consisting of a trapezoidal portion and a rectangular portion.

5. The light pipe of claim 1, wherein the light pipe is made of polymethyl methacrylate.

6. The light pipe of claim 1, wherein the light pipe is made of polycarbonate.

7. A light pipe comprising:

a body having an elongate shape;

a light-emitting face extending along the body in the direction of a longitudinal axis of the light pipe;

a light-reflecting face disposed opposite the light-emitting face over at least a portion of the light pipe, a plurality of prismatic cuts being formed in the light-reflecting face;

each of the prismatic cuts having a front face oriented at an angle B from a normal axis, the normal axis being oriented 90 degrees from the longitudinal axis, wherein the angle B is in the range of about 5 degrees to about 45 degrees;

wherein the angle B is less than or equal to an angle B', wherein the angle B' is defined by the equation:

$$B' = \frac{\pi}{2} - \arcsin\left(\frac{1}{n}\right) - \arcsin\left(\frac{\sin(X)}{n}\right)$$

wherein X is the desired angle of light emission from the light-emitting face as measured from the normal axis; and wherein n is the index of refraction of a material from which the light pipe is formed.

8. The light pipe of claim 7, wherein the angle X is in the range of about 20 degrees to about 45 degrees.

9. An illuminating device for use in a motor vehicle, comprising:

a light guide comprising:

a body having an elongate shape;

a light-emitting face extending along the body in the direction of a longitudinal axis of the light guide; and a light-reflecting face disposed opposite the light-emitting face over at least a portion of the light guide, a plurality of prismatic cuts formed in the light-reflecting face;

each of the prismatic cuts having a front face oriented at an angle B from a normal axis, the normal axis being oriented 90 degrees from the longitudinal axis, wherein the angle B is in the range of about 5 degrees to about 45 degrees;

a light source coupled to an end of the light guide; and wherein the angle B is less than or equal to an angle B', wherein the angle B' is defined by the equation:

$$B' = \frac{\pi}{2} - \arcsin\left(\frac{1}{n}\right) - \arcsin\left(\frac{\sin(X)}{n}\right)$$

wherein X is the desired angle of light emission from the light-emitting face as measured from the normal axis; and wherein n is the index of refraction of a material from which the light guide is formed.

10. The illuminating device of claim 9, wherein each of the prismatic cuts has a rear face oriented at an angle A from the normal axis, wherein the angle A is less than about 40 degrees.

11. The illuminating device of claim 10, further comprising:

a light launching face located at a first end of the body; and a retroreflector located remote from the light launching face at a second end of the body, the retroreflector configured to reflect light back toward the first end of the body.

12. The illuminating device of claim 10, wherein the light guide has a cross-section comprising a circular portion combined with a member selected from the group consisting of a trapezoidal portion and a rectangular portion.

13. The illuminating device of claim 9, wherein the angle X is in the range of about 20 degrees to about 45 degrees.

14. The illuminating device of claim 9, wherein the light guide is made of polymethyl methacrylate.

15. The illuminating device of claim 9, wherein the light guide is made of polycarbonate.

* * * * *